US007622905B2

(12) United States Patent
Huang et al.

(10) Patent No.: US 7,622,905 B2
(45) Date of Patent: Nov. 24, 2009

(54) VOLTAGE REGULATOR OF A DC POWER SUPPLY

(75) Inventors: Shyh-Ching Huang, Taipei Hsien (TW); Chun-Ta Lee, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 309 days.

(21) Appl. No.: 11/695,054

(22) Filed: Apr. 1, 2007

(65) Prior Publication Data

US 2008/0079412 A1 Apr. 3, 2008

(30) Foreign Application Priority Data

Oct. 3, 2006 (TW) .............................. 95136681 A

(51) Int. Cl.
*G06F 1/00* (2006.01)
*H02H 9/08* (2006.01)

(52) U.S. Cl. ....................... 323/284; 323/274; 323/906; 323/908; 361/93.9

(58) Field of Classification Search ......... 323/273–281, 323/299, 906, 908, 282, 284, 287, 288, 293, 323/297, 303, 326; 361/93.9; 320/101, 166
See application file for complete search history.

(56) References Cited

U.S. PATENT DOCUMENTS

| | | | | |
|---|---|---|---|---|
| 3,757,200 | A * | 9/1973 | Cohen | 323/226 |
| 5,705,912 | A * | 1/1998 | Ichihara | 320/125 |
| 6,377,033 | B2 * | 4/2002 | Hsu | 323/274 |
| 6,447,945 | B1 * | 9/2002 | Streckert et al. | 429/34 |
| 6,646,842 | B2 * | 11/2003 | Pan et al. | 361/58 |
| 6,749,892 | B2 * | 6/2004 | Chang | 427/115 |
| 2007/0247127 | A1 * | 10/2007 | Lopata | 323/282 |

FOREIGN PATENT DOCUMENTS

| | | |
|---|---|---|
| CN | 1082213 | 2/1994 |
| CN | 1627221 | 6/2005 |
| CN | 1770526 | 5/2006 |

* cited by examiner

*Primary Examiner*—Jessica Han
*Assistant Examiner*—Emily Pham
(74) *Attorney, Agent, or Firm*—Winston Hsu

(57) ABSTRACT

A voltage regulator for regulating a voltage of a direct current source is disclosed. The voltage regulator includes a current-limiting circuit and a power-storing circuit. The current-limiting circuit is used for limiting an output current of the direct current source. The power-storing circuit is used for storing output power of the direct current source.

16 Claims, 7 Drawing Sheets

VOLTAGE REGULATOR OF A DC POWER SUPPLY

BACKGROUND OF THE INVENTION

1. Field of the Invention

The present invention provides a voltage regulator for a direct current (DC) power supply, and more particularly, a voltage regulator for stabilizing an output voltage of a fuel cell.

2. Description of the Prior Art

Please refer to FIG. 1. FIG. 1 is a conventional power supply system 100 for a portable electronic device. As shown in FIG. 1, the power supply system 100 is coupled to a portable electronic device 140. The power supply system 100 comprises an alternating current (AC) power source 120 and an AC/DC converter 110. The portable electronic device 140 comprises a conventional battery 130. The AC power source 120 is coupled to the AC/DC converter 110 for providing AC power to the AC/DC converter 110. The AC/DC converter 110 is coupled between the AC power source 120 and the conventional battery 130 for converting the received AC power to DC power and providing the DC power to the conventional battery 130 and the portable electronic device 140. Thus, the conventional battery 130 can be charged and the portable electronic device 140 can operate regularly.

When the AC power source 120 is not accessible, the AC/DC converter 110 cannot provide the DC power to the conventional battery 130 and the portable electronic device 140. Meanwhile, the portable electronic device 140 only operates by discharging the power stored in the conventional battery 130.

Generally, the ability of the conventional battery 130 to discharge has a ceiling. That is, the discharging period of the conventional battery 130 is limited. For example, the discharging period of a lithium cell for a notebook computer is about two hours. Therefore, when the portable electronic device 140 has to operate for more than two hours, the conventional battery 130 cannot provide enough power to the portable electronic device 140, which is a great inconvenience.

SUMMARY OF THE INVENTION

The present invention provides a voltage regulator of a DC power supply comprising a current-limiting circuit coupled to an output end of the DC power supply for limiting a current output from the DC power supply, and a storage circuit coupled between the current-limiting circuit and a ground end of the DC power supply for storing power output from the DC power supply.

The present invention further provides a fuel cell comprising a power output end for providing power, a ground end, a current-limiting circuit coupled to the power output end of the fuel cell for limiting a current from the power output end, and a storage circuit coupled between the current-limiting circuit and the ground end for storing the power output from the fuel cell.

The present invention further provides a portable electronic device using a fuel cell. The fuel cell comprises a power output end for providing power, a ground end, a current-limiting circuit coupled to the power output end of the fuel cell for limiting a current from the fuel cell, and a power-storing circuit coupled between the current-limiting circuit and the ground end of the fuel cell for storing the power. The portable electronic device is coupled between the power output end of the fuel cell and the ground end of the fuel cell for receiving a power regulated by the power-storing circuit.

The present invention further provides a portable electronic device using a fuel cell. The fuel cell comprises a power output end for providing power, and a ground end. The portable electronic device is coupled between the power output end of the fuel cell and the ground end of the fuel cell for receiving the power of the fuel cell. The portable electronic device comprises a current-limiting circuit coupled to the power output end of the fuel cell for limiting a current from the fuel cell, and a storage circuit coupled between the current-limiting circuit and the ground end of the fuel cell for storing the power output from the fuel cell.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
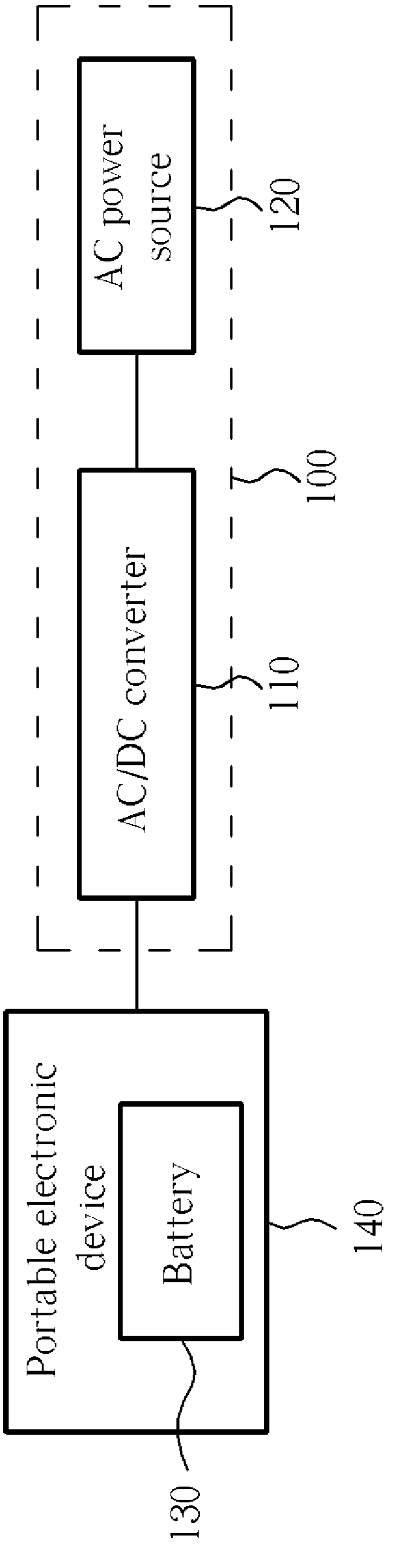
Fig. 1 Prior Art
FIG. 1 is a diagram of a conventional power supply system for a portable electronic device.
Figure 2:
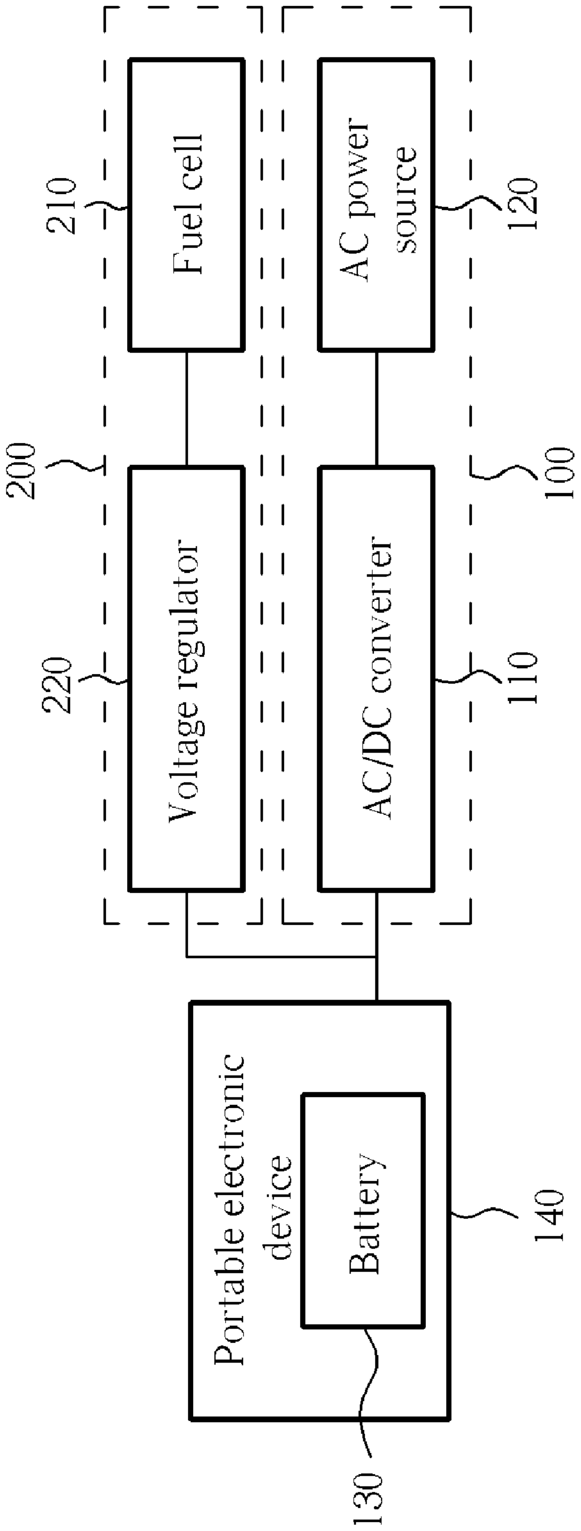
FIG. 2 is a diagram illustrating a power supply system of the present invention.
Figure 7:
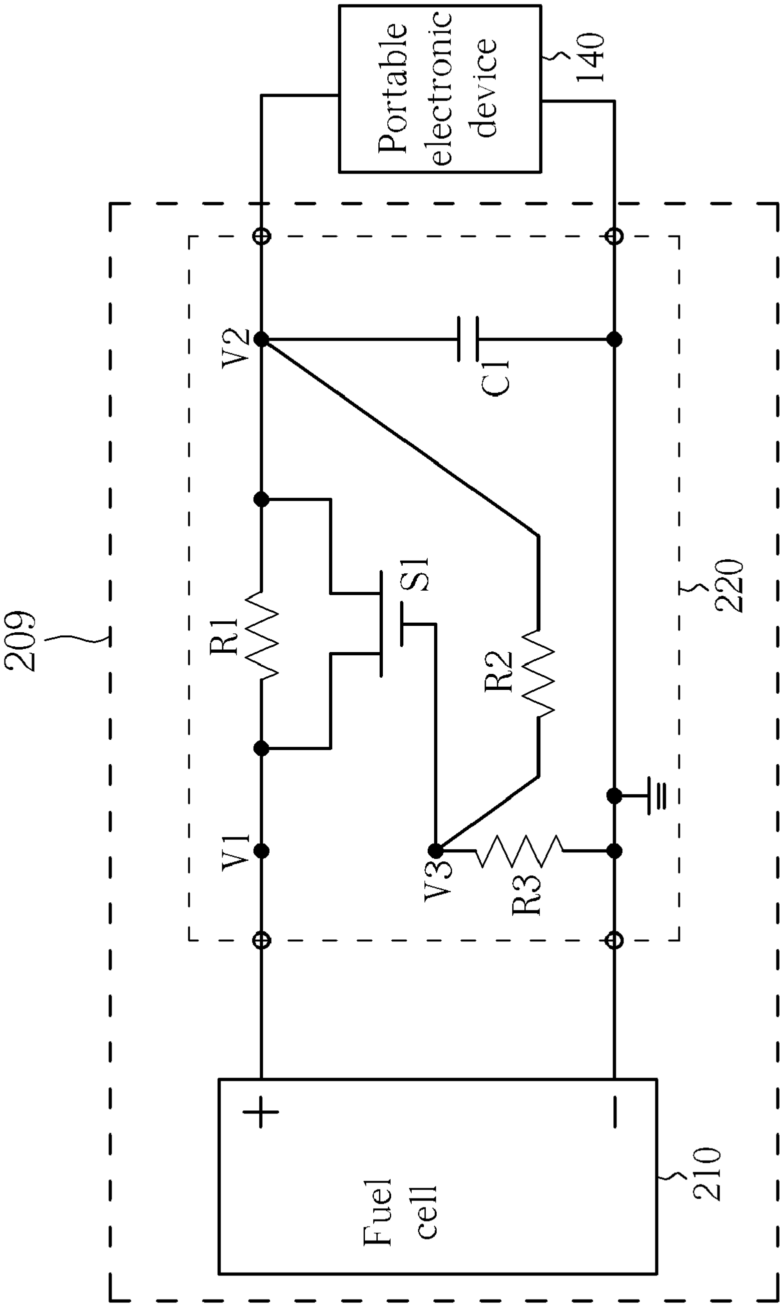
FIG. 7 is a diagram illustrating one embodiment where the voltage regulator of FIG. 2 is built into the fuel cell module.

Please refer to FIG. 2. FIG. 2 is a diagram illustrating a power supply system 200 of the present invention. The power supply system 200 comprises a DC power source 210 and a voltage regulator 220. It is assumed that the DC power source 210 is a fuel cell. As shown in FIG. 2, for the portable electronic device 140 and the battery 130, the present invention provides a conventional power supply system 100 and an additional power supply system 200. The fuel cell 210 is coupled to the voltage regulator 220 for providing DC power. The voltage regulator 220 is coupled to the portable electronic device 140 for stabilizing output DC power of the fuel cell 210 and transmitting the stabilized DC power to the portable electronic device 140 and the conventional battery 130 so that the portable electronic device 140 can operate regularly and the conventional battery 130 can be charged. Thus, when the conventional power supply system 100 and the discharging period of the conventional battery 130 is limited, the power supply system 200 is provided to extend the regular operating period of the portable electronic device 140. The voltage regulator 220 is not limited to the form shown in FIG. 2. The voltage regulator 220 can also be built in the portable electronic device 140 or the fuel cell 210. For instances, FIG. 7 shows one embodiment where the voltage regulator 220 of FIG. 2 is built into the fuel cell module 209, so the fuel cell module 209 comprises the fuel cell 210 and the voltage regulator 220. Additionally, the portable electronic device 140 can have the conventional battery 130 and the fuel cell 210 both built in or only the fuel cell 210 built in. If the fuel cell 210 is disposed in the portable electronic device 140, when the fuel material runs out, a user need only replace the fuel tank or open the fuel tank to refill it with the fuel material.

The fuel cell 210 can be a direct methanol fuel cell or a proton exchange membrane fuel cell. The direct methanol fuel cell is characterized by high power density and ease of transport. When the power stored in the direct methanol fuel cell runs out, a user can add methyl alcohol, and then the direct methanol fuel cell can continue outputting power.

One drawback of the direct methanol fuel cell is unstable output power which is hard for the portable electronic device 140 and the conventional battery 130 to use. Therefore, another voltage regulator 220 is necessary to stabilize the output power of the direct methanol fuel cell.

Figure 3:
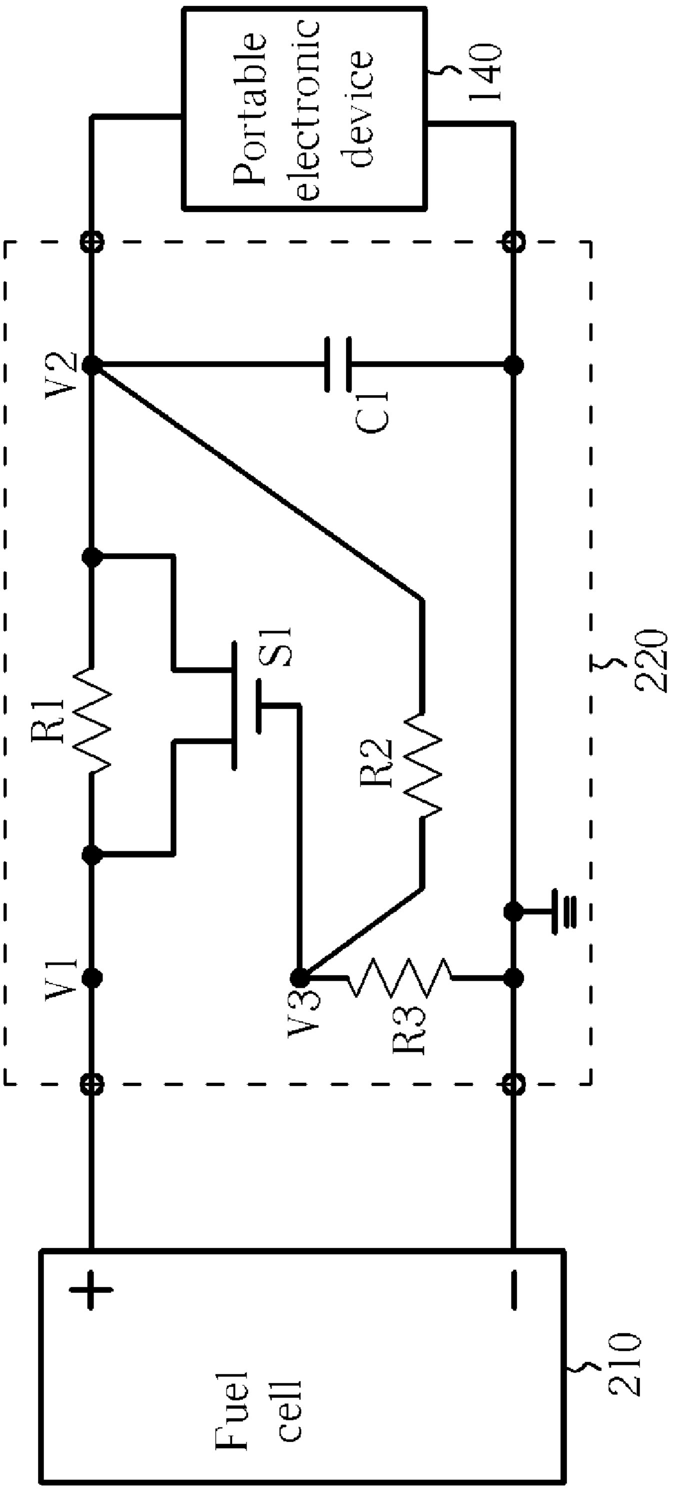
FIG. 3 is a diagram illustrating a voltage regulator of a first embodiment of the present invention.

Please refer to FIG. 3. FIG. 3 is a diagram illustrating the voltage regulator of a first embodiment of the present invention. As shown in FIG. 3, the voltage regulator 220 comprises an current-limiting circuit, a power-saving circuit, and a power-storing circuit. It is assumed that the current-limiting circuit is a resistor R1, the power-saving circuit comprises resistors R2, R3 and a switch S1, and the power-storing circuit is a storage capacitor C1. The resistor R2 is coupled to the storage capacitor C1. The resistor R3 is coupled to a negative end (ground end) of the fuel cell 210. One end of the resistor R1 is coupled to a positive end of the fuel cell 210 while another end of the resistor R1 is coupled to the storage capacitor C1. The switch S1 is coupled between both ends of the resistor R1 while a control end of the switch S1 is coupled between the resistors R2 and R3. One end of the storage capacitor C1 is coupled to the ground end while the other end of the storage capacitor C1 is coupled to an input end of the portable electronic device 140.

Because the power consumption of the portable electronic device 140 increases as the number of tasks the portable electronic device 140 is operating on increases, and the fuel cell 210 cannot provide stable power in time to the portable electronic device 140 when the portable electronic device 140 suddenly becomes busy, the storage capacitor C1 is disposed between the fuel cell 210 and the portable electronic device 140. Therefore, when the portable electronic device 140 is not busy, the storage capacitor C1 can store power, and when the portable electronic device 140 is abruptly busy, the storage capacitor C1 can release the stored power to the portable electronic device 140 and maintain the voltage V2 shown in FIG. 3 at a constant voltage level. In this way, the portable electronic device 140 can be provided with stable power whether the portable electronic device 140 is busy or not. Generally, the capacitance of the storage capacitor C1 is greater than 0.1 F (farad).

Before the fuel cell 210 is coupled to the voltage regulator 220, the storage capacitor C1 is completely discharged. Once the fuel cell 210 is coupled to the voltage regulator 220, the storage capacitor C1 starts charge and sink current. To prevent the output voltage of the fuel cell 210 from being lowered because the storage capacitor C1 sinks the current, the voltage regulator 220 is designed with a resistor R1 between the output end of the fuel cell 210 and the storage capacitor C1 for limiting the current of the fuel cell 210 and preventing the components of the fuel cell 210 and the voltage regulator 220 from being damaged.

After the storage capacitor C1 has charged for a while, the storage capacitor C1 sinks only a little current. Therefore, we do not have to limit the output current of the fuel cell 210. In other words, the resistor R1 becomes useless and wastes power. Consequently, the voltage regulator 220 of the present invention comprises a switch S1 across the resistor R1 for shorting the ends of the resistor R1 after the storage capacitor C1 is charged so that the current passes through the switch S1 rather than the resistor R1. In this way, the resistor R1 does not waste power.

Please continue to refer to FIG. 3. As shown in FIG. 3, the voltage V3 is described by the following formula: $V3=V2\times(R3/(R2+R3))$. The voltage V2 rises from 0 V (one end of the storage capacitor C1 is coupled to the ground end) at the moment the storage capacitor C1 begins charging. Thus, the voltage regulator 220 is designed to turn on the switch S1 when the voltage V2 is higher than the voltage V3 by a predetermined value for passing the current through the switch S1 instead of the resistor R1.

If the switch S1 is realized with a MOS (metal oxygen semiconductor, MOS) transistor, the predetermined value is the threshold voltage of the MOS transistor.

Figure 4:
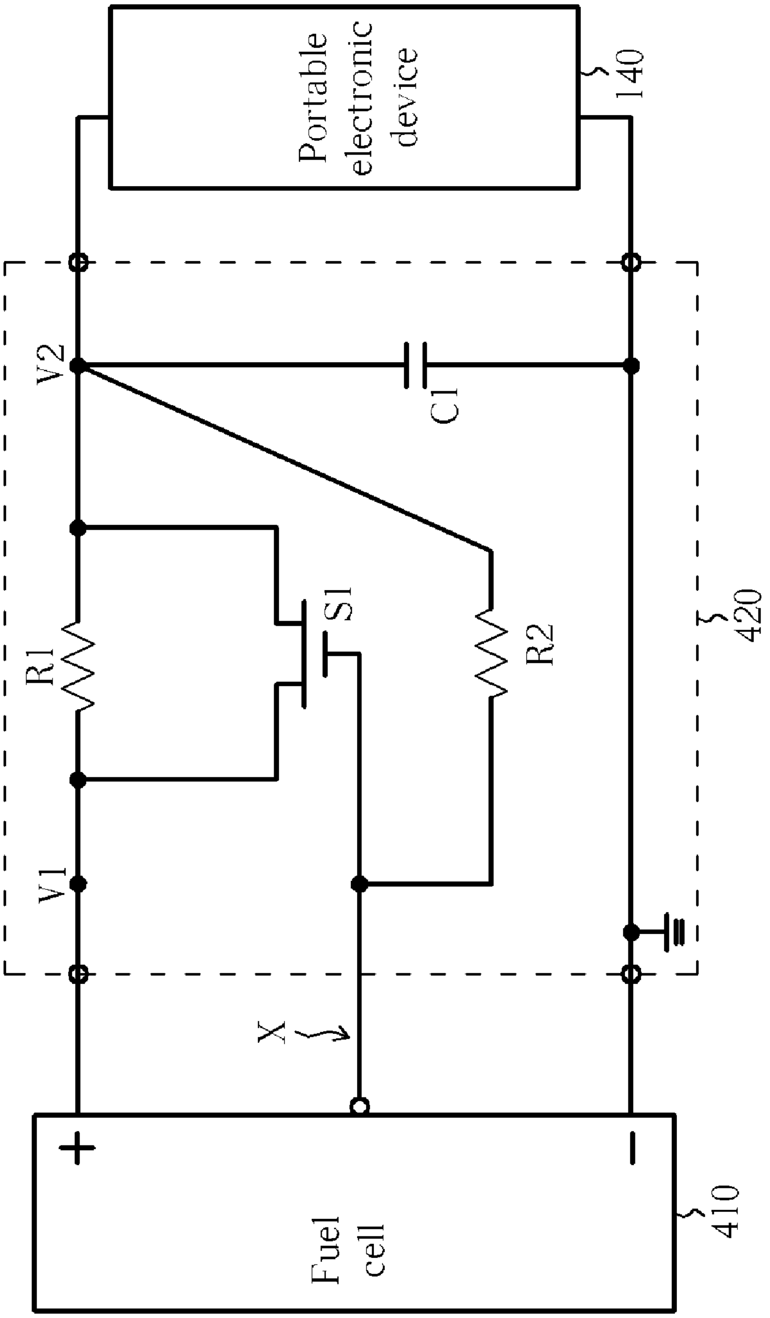
FIG. 4 is a diagram illustrating a voltage regulator of a second embodiment of the present invention.

Please refer to FIG. 4. FIG. 4 is a diagram illustrating a voltage regulator 420 of a second embodiment of the present invention. The voltage regulator 420 is similar to the voltage regulator 220, the difference between them being that in the voltage regulator 420, the control end of the switch S1 is controlled by the fuel cell 410. Generally, aside from providing power, the fuel cell provides a control signal X for informing users that the power condition is ready. Therefore, when the fuel cell 410 transmits the control signal X to the switch S1, it means that the power condition is ready so that the resistor R1 and the current limiting function are not needed. Additionally, the resistor R2 is added to stabilize the signal on the control end of the switch S1. When the fuel cell 410 does not transmit the control signal X to the switch S1, the resistor R2 prevents the voltage on the control end of the switch S1 from floating so that the switch S1 works regularly.

Figure 5:
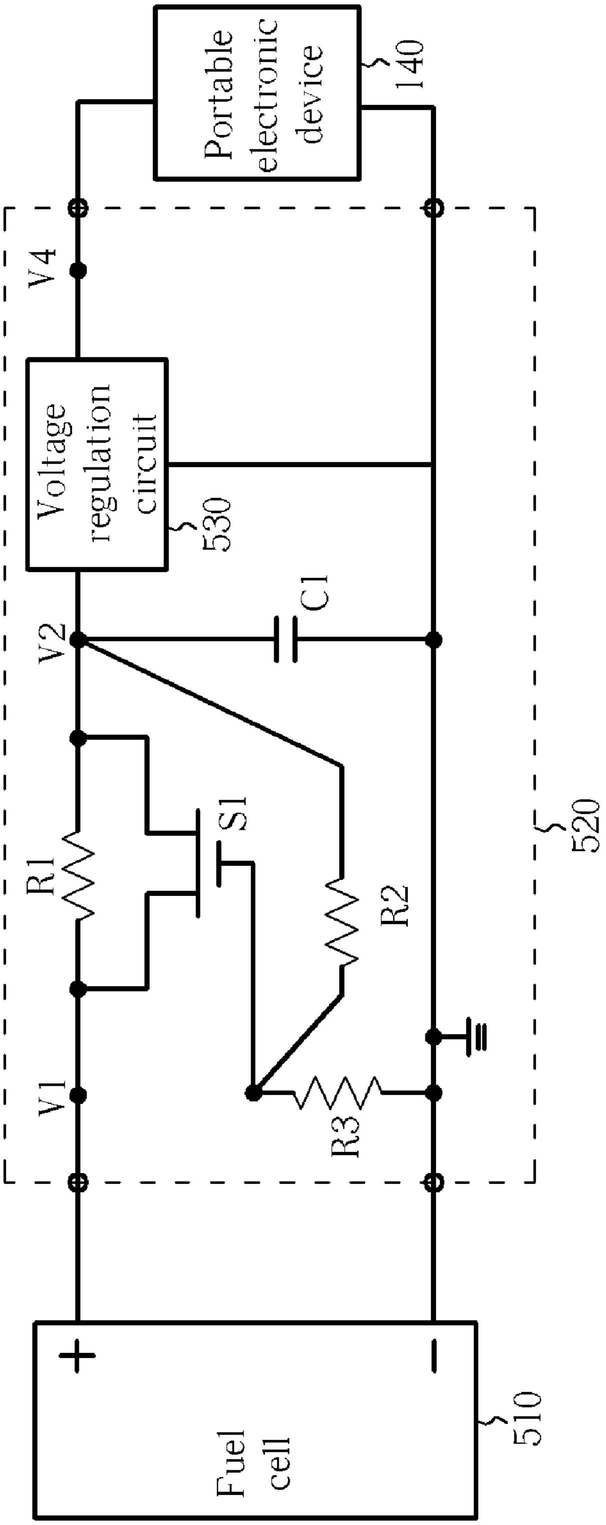
FIG. 5 is a diagram illustrating a voltage regulator of a third embodiment of the present invention.

Please refer to FIG. 5. FIG. 5 is a diagram illustrating the voltage regulator 520 of a third embodiment of the present invention. As shown in FIG. 5, the voltage regulator 520 is similar to the voltage regulator 220, and the difference between them is that in the voltage regulator 520, a voltage regulation circuit 530 is disposed between the storage capacitor C1 and the portable electronic device 140. The voltage regulation circuit 530 is disposed for further stabilizing the voltage V2, and outputting a voltage V4 to the portable electronic device 140. Consequently, the voltage regulator 520 has better performance.

Figure 6:
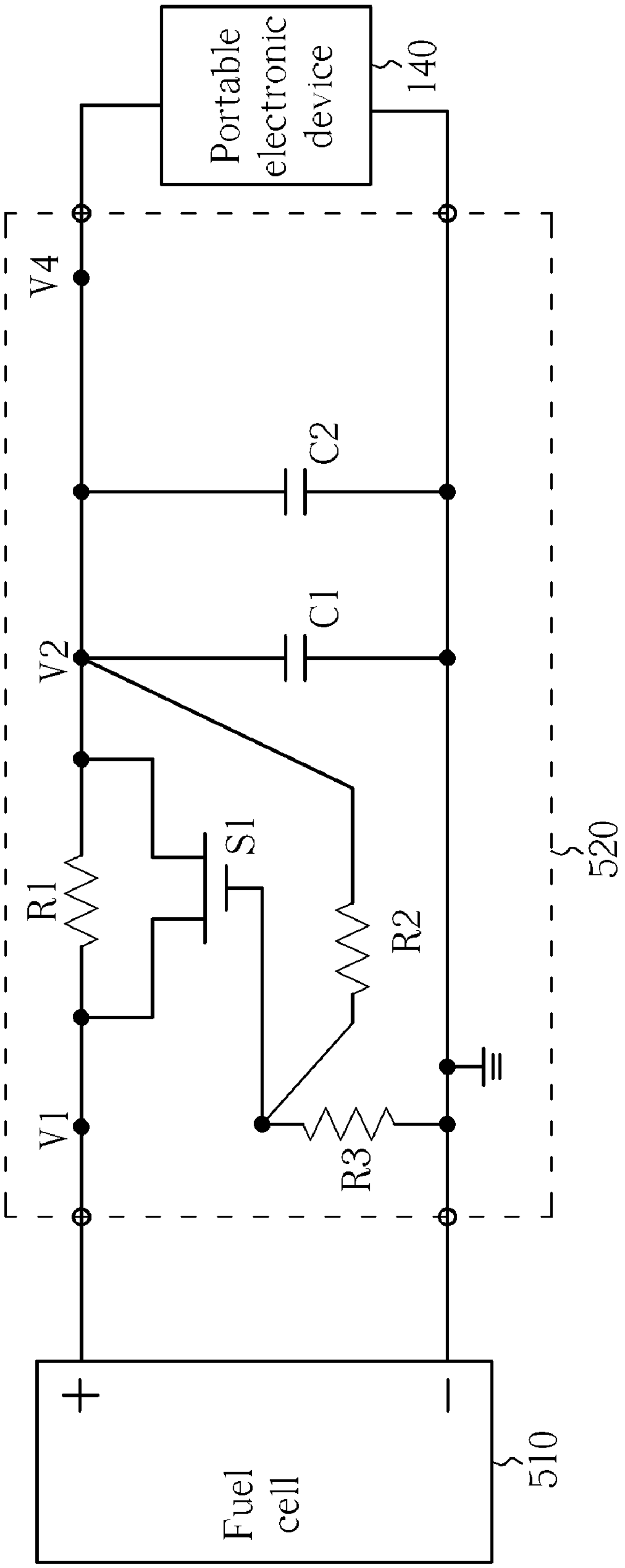
FIG. 6 is a diagram illustrating one embodiment where the regulation circuit of FIG. 5 is realized with a second capacitor.

The voltage regulation circuit 530 can be realized with a switching regulator, a linear regulator, or a capacitor. Please refer to FIG. 6. FIG. 6 illustrates an embodiment where the regulation circuit 530 of FIG. 5 is realized with a second capacitor C2.

The portable electronic device 140 can be realized with a notebook PC, a personal digital assistant, or any electronic device that is easy to carry. Also, in FIG. 3 through FIG. 5, having one end of the resistor R2 coupled to the voltage V2 is only used as an example. The end of the resistor R2 can still be designed to be coupled to the voltage V1. When the end of the resistor R2 is coupled to the voltage V1, the switch S1 is turned earlier and possibly allows a higher current to flow to the capacitor C1.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage regulator of a DC power supply comprising:

a current-limiting circuit coupled to an output terminal of the DC power supply for limiting a current output from the DC power supply;

a power-storing circuit coupled between the current-limiting circuit and a ground terminal of the DC power supply for storing a power output from the DC power supply; and a power-saving circuit, coupled between the output terminal of the DC power supply and the power-storing circuit for saving a power consumed by the current-limiting circuit, comprising:

a switch comprising:

a first terminal coupled to the output terminal of the DC power supply;

a second terminal coupled to the power-storing circuit; and a control terminal;

wherein the switch is turned on when a first voltage is higher than a second voltage by a predetermined value;

a second resistor connected directly between the second terminal of the switch and the control terminal of the switch; and a third resistor coupled between the control terminal of the switch and the ground terminal of the DC power supply;

wherein the second voltage is obtained by dividing the first voltage via the second resistor and the third resistor.

2. The voltage regulator of claim 1 wherein the current-limiting circuit comprises a first resistor coupled between the output terminal of the DC power supply and the power-storing circuit.

3. The voltage regulator of claim 1 wherein the power-storing circuit comprises a first capacitor.

4. The voltage regulator of claim 3 wherein a capacitance of the first capacitor is higher than 0.1 Farads.

5. The voltage regulator of claim 1 further comprising a voltage regulation circuit coupled between the current-limiting circuit and the ground terminal of the DC power supply for further stabilizing a voltage output from the DC power supply.

6. The voltage regulator of claim 5 wherein the voltage regulation circuit comprises a second capacitor.

7. A voltage regulator of a DC power supply comprising:

a current-limiting circuit coupled to an output terminal of the DC power supply for limiting a current output from the DC power supply;

a power-storing circuit coupled between the current-limiting circuit and a ground terminal of the DC power supply for storing a power output from the DC power supply; and a power-saving circuit, coupled between the output terminal of the DC power supply and the power-storing circuit for saving a power consumed by the current-limiting circuit, comprising:

a switch comprising:

a first terminal coupled to the output terminal of the DC power supply;

a second terminal coupled to the power-storing circuit; and a control terminal coupled to a control signal output terminal of the DC power supply; and a second resistor connected directly between the power-storing circuit and the control terminal of the switch;

wherein the DC power supply transmits a control signal through the control signal output terminal of the DC power supply when the DC power supply is ready, for turning on the switch.

8. A fuel cell comprising:

a power output terminal for providing power;

a ground terminal;

a current-limiting circuit coupled to the power output terminal for limiting a current from the power output terminal;

a power-storing circuit coupled between the current-limiting circuit and the ground terminal for storing the power output from the fuel cell; and a power-saving circuit, coupled between the power output terminal and the power-storing circuit for saving a power consumed by the current-limiting circuit, comprising:

a switch comprising:

a first terminal coupled to the power output terminal;

a second terminal coupled to the power-storing circuit; and a control terminal;

wherein the switch is turned on when a first voltage is higher than a second voltage by a predetermined value;

a second resistor connected directly between the second terminal of the switch and the control terminal of the switch; and a third resistor coupled between the control terminal of the switch and the ground terminal;

wherein the second voltage is obtained by dividing the first voltage via the second resistor and the third resistor.

9. A portable electronic device using a fuel cell, wherein the fuel cell comprises a power output terminal for providing power and a ground terminal, and the portable electronic device is coupled between the power output terminal of the fuel cell and the ground terminal of the fuel cell for receiving the power of the fuel cell, the portable electronic device comprising:

a current-limiting circuit coupled to the power output terminal of the fuel cell for limiting a current from the fuel cell;

a power-storing circuit coupled between the current-limiting circuit and the ground terminal of the fuel cell for storing the power output from the fuel cell; and a power-saving circuit, coupled between the power output terminal and the power-storing circuit for saving a power consumed by the current-limiting circuit, comprising:

a switch comprising:

a first terminal coupled to the power output terminal;

a second terminal coupled to the power-storing circuit; and a control terminal;

wherein the switch is turned on when a first voltage is higher than a second voltage by a predetermined value;

a second resistor connected directly between the second terminal of the switch and the control terminal of the switch; and a third resistor coupled between the control terminal of the switch and the ground terminal;

wherein the second voltage is obtained by dividing the first voltage via the second resistor and the third resistor.

10. The portable electronic device of claim 9 wherein the current-limiting circuit comprises a first resistor coupled between the power output terminal of the fuel cell and the power-storing circuit.

11. The portable electronic device of claim 9 wherein the power-storing circuit comprises a first capacitor.

12. The portable electronic device of claim 11 wherein the first capacitor is a capacitor having a capacitance higher than 0.1 Farads.

13. The portable electronic device of claim 9 further comprising a voltage regulation circuit coupled between the current-limiting circuit and the ground terminal of the fuel cell for further stabilizing a voltage output from the fuel cell.

14. The portable electronic device of claim 13 wherein the voltage regulation circuit comprises a second capacitor.

15. The portable electronic device of claim 9 wherein the switch is a MOS transistor.

16. A portable electronic device using a fuel cell, wherein the fuel cell comprises a power output terminal for providing power and a ground terminal, and the portable electronic device is coupled between the power output terminal of the fuel cell and the ground terminal of the fuel cell for receiving the power of the fuel cell, the portable electronic device comprising:

a current-limiting circuit coupled to the power output terminal of the fuel cell for limiting a current from the fuel cell;

a power-storing circuit coupled between the current-limiting circuit and the ground terminal of the fuel cell for storing the power output from the fuel cell; and a power-saving circuit, coupled between the power output terminal and the power-storing circuit for saving a power consumed by the current-limiting circuit, comprising:

a switch comprising:

a first terminal coupled to the power output terminal;

a second terminal coupled to the power-storing circuit; and a control terminal coupled to a control signal output terminal of the fuel cell; and a second resistor connected directly between the power-storing circuit and the control terminal of the switch;

wherein the fuel cell transmits a control signal through the control signal output terminal when the fuel cell is ready, for turning on the switch.

* * * * *